(12) United States Patent
Yokoi

(10) Patent No.: US 8,174,554 B2
(45) Date of Patent: May 8, 2012

(54) OPTICAL SCANNING DEVICE AND PRINTING APPARATUS USING A THRESHOLD MATRIX TO IMPROVE IMAGE QUALITY

(75) Inventor: Junichi Yokoi, Toyoake (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 948 days.

(21) Appl. No.: 12/174,789

(22) Filed: Jul. 17, 2008

(65) Prior Publication Data
US 2009/0021759 A1 Jan. 22, 2009

(30) Foreign Application Priority Data
Jul. 18, 2007 (JP) ................. 2007-187273

(51) Int. Cl.
*B41J 2/47* (2006.01)
(52) U.S. Cl. ................................... 347/254
(58) Field of Classification Search .......... 347/131, 347/135, 240, 251–254; 358/1.2, 1.3, 3.13, 358/3.23, 3.03, 3.06, 3.1, 534–536
See application file for complete search history.

(56) References Cited

U.S. PATENT DOCUMENTS

| | | | |
|---|---|---|---|
| 5,392,060 | A | 2/1995 | Imakawa |
| 7,405,743 | B2 * | 7/2008 | Toyama et al. ............ 347/131 |
| 2007/0046767 | A1 | 3/2007 | Toyama et al. |

FOREIGN PATENT DOCUMENTS

| | | |
|---|---|---|
| JP | 5037750 | 2/1993 |
| JP | 2001136386 | 5/2001 |
| JP | 2007-062097 | 3/2007 |
| JP | 2007062099 | 3/2007 |

OTHER PUBLICATIONS

Japanese Patent Application 2007-187273, Decision of Patent Grant, dated Dec. 13, 2011 (English Translation Attached).

* cited by examiner

*Primary Examiner* — Hai C Pham
(74) *Attorney, Agent, or Firm* — Banner & Witcoff, Ltd.

(57) ABSTRACT

An optical scanning device includes: an emission unit which emits a light beam; an oscillating mirror which deflects the light beam to reciprocate on a scanning surface; and a controller which controls the emission unit to be on and off to form a pattern of dots in each cell of a plurality of cells defined on the scanning surface, the pattern being formed according to a gradation of the cell and based on a dot-concentrated threshold matrix. The threshold matrix is defined such that the pattern of dots to be formed in the cell includes a plurality of pairs of adjacent dots in a sub-scanning direction. Among the plurality of pairs of adjacent dots to be formed, a number of pairs of adjacent dots which are closer than an interval of adjacent ideal scanning lines is equal to a number of pairs of adjacent dots which are further than the interval.

15 Claims, 11 Drawing Sheets

OPTICAL SCANNING DEVICE AND PRINTING APPARATUS USING A THRESHOLD MATRIX TO IMPROVE IMAGE QUALITY

CROSS-REFERENCE TO RELATED APPLICATION

This application claims priority from Japanese Patent Application No. 2007-187273, filed on Jul. 18, 2007, the entire subject matter of which is incorporated herein by reference.

TECHNICAL FIELD

Aspects of the present invention relate to an optical scanning device including an oscillating mirror and a printing apparatus.

BACKGROUND

An optical scanning device, for example provided in a laser printer, utilizes an oscillating mirror (micrometer) other than a polygon mirror driven to rotate by a motor. This optical scanning device is configured such that the oscillating mirror is driven to rotate by an electrostatic force so that laser light from a light source is deflected by the oscillating mirror to thereby perform reciprocating scanning on a photosensitive material. FIG. 10 is a view showing the relation between the rotation angle of the oscillating mirror and the scanning locus of laser light in a related-art optical scanning device. Such laser light scans on the photosensitive material in its center portion (solid line portion in FIG. 10) except its both end portions (broken line portions in FIG. 10). As apparent from FIG. 10, the distances d1, d2 between ends of adjacent main scanning lines R in a sub-scanning direction varies in the configuration in which laser light reciprocatorily scans on the photosensitive material by use of the oscillating mirror. For this reason, a density difference may occur between the both ends in a main scanning direction because of this scan skewing.

Japanese Patent Application Publication No. 2007-62097 describes a technique in which a plurality of cells each composed of a plurality of pixels and having a dot pattern formed according to the gradation of an image are separated from each other by odd-number pixels in the sub-scanning direction to thereby suppress the density difference in the main scanning direction on the entire image.

However, in the technique, it is impossible to obtain an effect of suppressing the density difference unless a certain large number of cells are formed. In addition, there is a problem that blank regions corresponding to the odd-number pixels are formed between the adjacent cells.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an optical scanning device which can suppress density difference in a main scanning direction by using a relatively small number of cells, and a printing apparatus.

According to an exemplary embodiment of the present invention, there is provided an optical scanning device comprising: an emission unit which emits a light beam; an oscillating mirror which deflects the light beam to reciprocate on a scanning surface in a main scanning direction; and a controller which controls the emission unit to be on and off to form a pattern of dots in each cell of a plurality of cells defined on the scanning surface, each cell being composed of a plurality of pixels, the pattern being formed according to a gradation of the cell and based on a dot-concentrated threshold matrix. The threshold matrix is defined such that the pattern of dots to be formed in the cell includes a plurality of pairs of adjacent dots in a sub-scanning direction, the sub-scanning direction being orthogonal to the main scanning direction. Among the plurality of pairs of adjacent dots to be formed, a number of pairs of adjacent dots which are closer than an interval of adjacent ideal scanning lines is equal to a number of pairs of adjacent dots which are further than the interval.

According to another exemplary embodiment of the present invention, there is provided a printing apparatus comprising: a printing unit including a photosensitive material; and an optical scanning device. The optical scanning device comprises: an emission unit which emits a light beam; an oscillating mirror which deflects the light beam to reciprocate on the photosensitive material in a main scanning direction; and a controller which controls the emission unit to be on and off to form a pattern of dots in each cell of a plurality of cells defined on the photosensitive material, each cell being composed of a plurality of pixels, the pattern being formed according to a gradation of the cell and based on a dot-concentrated threshold matrix. The threshold matrix is defined such that the pattern of dots to be formed in the cell includes a plurality of pairs of adjacent dots in a sub-scanning direction, the sub-scanning direction being orthogonal to the main scanning direction. Among the plurality of pairs of adjacent dots to be formed, a number of pairs of adjacent dots which are closer than an interval of adjacent ideal scanning lines is equal to a number of pairs of adjacent dots which are further than the interval. The printing unit forms an image on the scanned photosensitive material and transferring the image onto a printing medium.

According to further exemplary embodiment of the present invention, there is provided an optical scanning device comprising: an emission unit which emits a light beam; an oscillating mirror which deflects the light beam to reciprocate on a scanning surface, which is moved in a first direction, in a first way and a second way opposite to the first way along a second direction orthogonal to the first direction; a controller which controls the emission unit to selectively emit the light beam to form a pattern of dots in each cell of a plurality of cells defined on the scanning surface, the pattern being formed according to a gradation of the cell and based on a threshold matrix. The threshold matrix is defined such that the pattern of dots to be formed in the cell includes a pair of adjacent dots in the first direction. Among the plurality of adjacent dots, the number of pairs of adjacent dots to be formed by the light beam through a reciprocation from the first way to the second way is equal to the number of pairs of dots to be formed by the light beam through a reciprocation from the second way to the first way.

According to still further exemplary embodiment of the present invention, there is provided an optical scanning device comprising: an emission unit which emits a tight beam; an oscillating mirror which deflects the light beam to reciprocate on a scanning surface in a main scanning direction; and a controller which controls the emission unit to be on and off to form a pattern of dots in each cell of a plurality of cells defined on the scanning surface, each cell being composed of a plurality of pixels, the pattern being formed according to a gradation of the cell and based on a dot-concentrated threshold matrix method. The pattern of dots in each cell is determined such that the pattern of dots to be formed in the cell includes a plurality of pairs of adjacent dots in a sub-scanning direction, the sub-scanning direction being orthogonal to the main scanning direction. Among the plurality of pairs of adjacent dots to be formed, a number of pairs of adjacent dots which are closer than an interval of adjacent ideal scanning lines is equal to a number of pairs of adjacent dots which are further than the interval.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

An exemplary embodiment of the present invention will be described with reference to FIGS. 1 to 9 and FIG. 11.

(Overall Configuration of Laser Printer)

Figure 1:
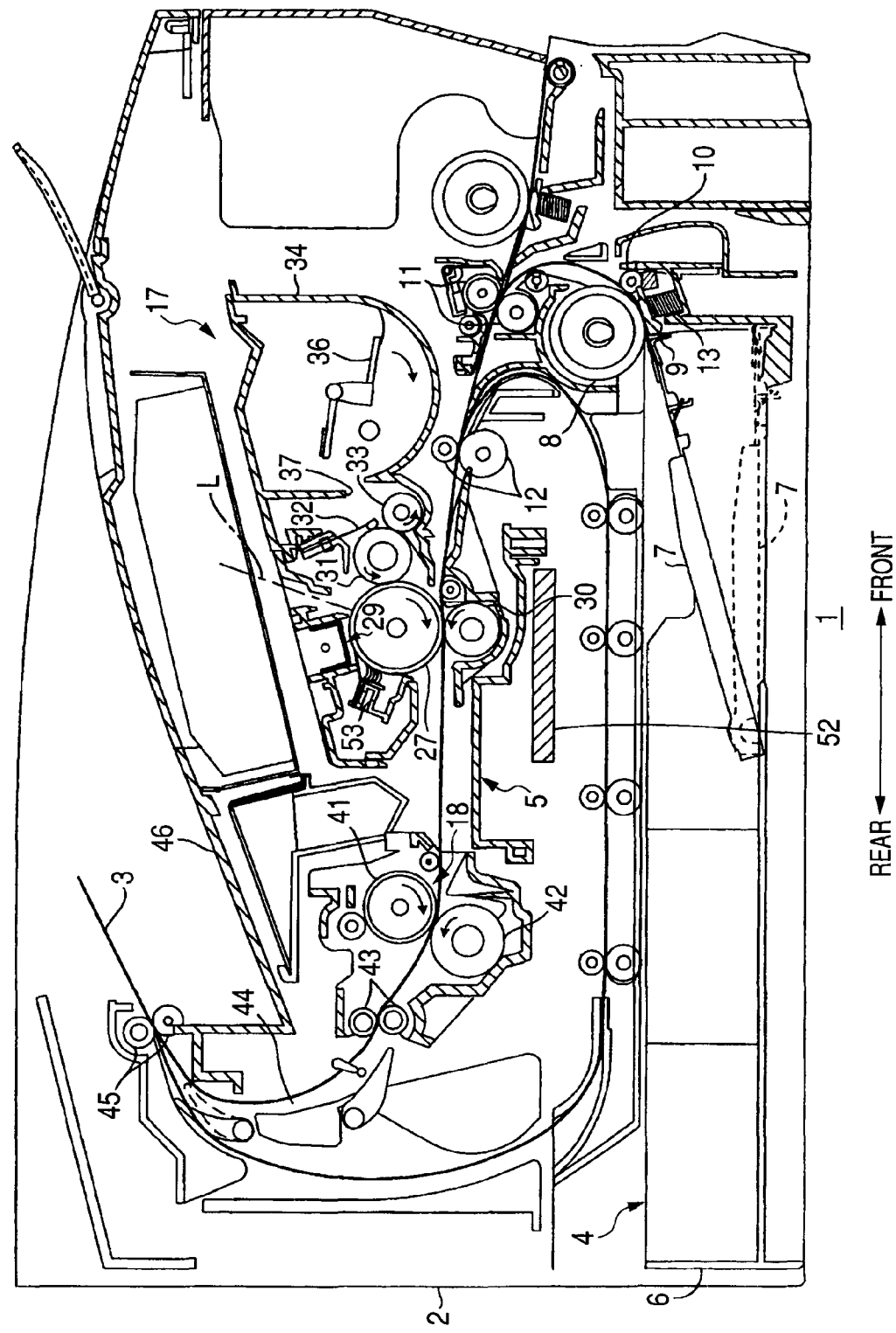
FIG. 1 is a side sectional view of main part of a laser printer according to an exemplary embodiment of the invention.

FIG. 1 is a side sectional view of main part of a laser printer 1 as an example of a printing apparatus. The laser printer 1 includes a body frame 2, a feeder unit 4 for feeding sheets 3 as an example of the printing medium, and a printing unit 5 for forming an image on the sheets 3 fed from the feeder unit 4. The feeder unit 4 and the printing unit 5 are provided in the body frame 2.

1. Feeder Unit

The feeder unit 4 includes a sheet feeding tray 6, a pressing plate 7, a feed roller 8 and a separation pad 9, paper dust removing rollers 10 and 11, and registration rollers 12. The separation pad 9 is pressed against the feed roller 8 by a spring 13. The right and left sides in FIG. 1 are hereinafter referred to as front and rear sides of the laser printer 1, respectively.

The pressing plate 7 has a rear end portion on which the pressing plate 7 can pivot, and a front end portion which is urged upward by a spring (not shown). Thus, the topmost sheet 3 on the pressing plate 7 is pressed toward the feed roller 8. The sheets 3 on the pressing plate 7 are fed one by one after held between the feed roller 8 and the separation pad 9 in accordance with rotation of the feed roller 8.

After paper dust is removed from each fed sheet 3 by the paper dust removing rollers 10 and 11, the fed sheet 3 is sent to the registration rollers 12. The registration rollers 12 send the sheet 3 to a transfer position after registration of the sheet 3. This transfer position is a position where a toner image on a photosensitive drum 27 is transferred to the sheet 3 and which is set as a position of contact between the photosensitive drum 27 as an example of the photosensitive material and a transfer roller 30 as an example of the transfer unit.

2. Printing Unit

The printing unit 5 includes a scanner unit 16, a process cartridge 17, and a fixing unit 18.

Figure 2:
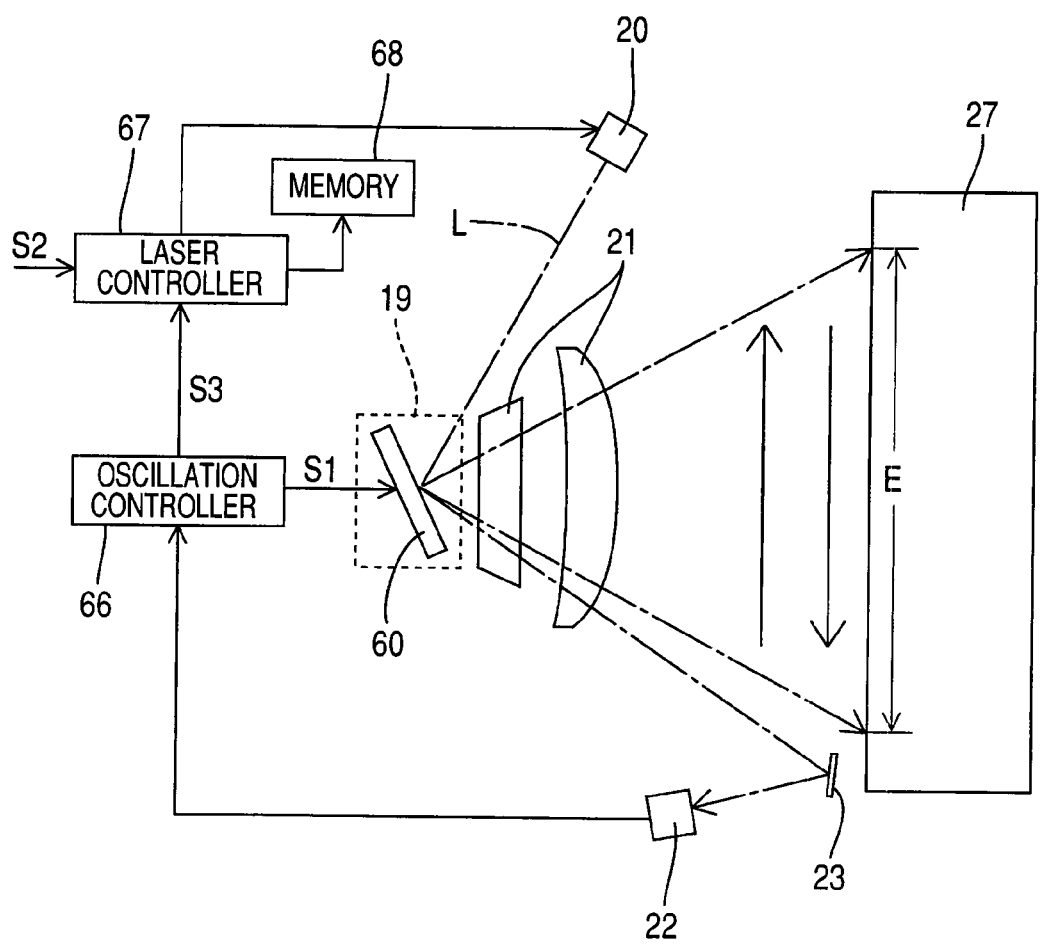
FIG. 2 is a schematic view showing the configuration of a scanner unit.

FIG. 2 is a schematic view showing the configuration of the scanner unit 16 as an example of an optical scanning device. A light-emitting unit 20 such as a laser diode, as an example of the emission unit operates to be on/off based on an image signal. Laser light L as a light beam emitted from the light-emitting unit 20 is deflected by an oscillating mirror 19 as shown in the chain line in FIG. 2. Thus deflected laser light L passes through an optical system 21 such as an arcsine lens to thereby form an image on the surface of the photosensitive drum 27 so that an electrostatic latent image is formed in a printing region E on the surface of the photosensitive drum 27. That is, the oscillating mirror 19 deflects the laser light L to reciprocate on the surface of the photosensitive drum 27. In addition, a BD sensor 22 such as a photodiode, as an example of the optical sensor for detecting the laser light L passed through the optical system 21 at a predetermined position is provided in the scanner unit 16. Specifically, the scanner unit 16 is configured such that the laser light L passed through the optical system 21 is made incident onto the BD sensor 22 through a reflecting mirror 23.

The detection timing of the laser light L in the BD sensor 22 is used for adjusting start timing of irradiation of the laser light L in the printing region E. The scanner unit 16 further includes an oscillation controller 66 and a laser controller 67. Details of the oscillating mirror 19 will be described later.

The process cartridge 17 includes a developing roller 31, a layer thickness regulating blade 32, a supply roller 33 and a toner hopper 34. Toner in the toner hopper 34 is agitated by an agitator 36 and released from a toner supply port 37. During development, a developing bias voltage is applied to the developing roller 31 by an application circuit (not shown).

The toner released from the toner supply port 37 is supplied to the developing roller 31 in accordance with rotation of the supply roller 33 while positively and electrostatically charged with friction between the supply roller 33 and the developing roller 31. Further, the toner supplied on the developing roller 31 is carried as a thin layer on the developing roller 31 formed by the layer thickness regulating blade 32.

The process cartridge 17 further includes the photosensitive drum 27, a scorotron type electrostatically charging unit 29, the transfer roller 30, and a cleaning brush 53. The surface of the photosensitive drum 27 is positively and electrostatically charged by the electrostatically charging unit 29. Thereafter, the surface is exposed to laser light L from the scanner unit 16 so that an electrostatic latent image is formed.

Then, the toner carried on the surface of the developing roller 31 is supplied to the electrostatic latent image formed on the photosensitive drum 27 so that development is made.

During transferring, a transfer bias voltage is applied to the transfer roller 30 by an application circuit (not shown). A cleaning bias voltage is applied to the cleaning brush 53, so that the cleaning brush 53 electrically attracts and removes paper dust deposited on the photosensitive drum 27.

The fixing unit 18 is configured such that toner is thermally fixed on the sheet 3 while the sheet 3 passes between a heating roller 41 and a pressing roller 42, and then the sheet 3 is conveyed to a sheet discharging path 44 by conveyance rollers 43. The sheet 3 sent to the sheet discharging path 44 is discharged onto a sheet discharging tray 46 by discharge rollers 45.

(Oscillating Mirror, Oscillation Controller and Laser Controller)

1. Oscillating Mirror and Oscillation Controller

Figure 3:
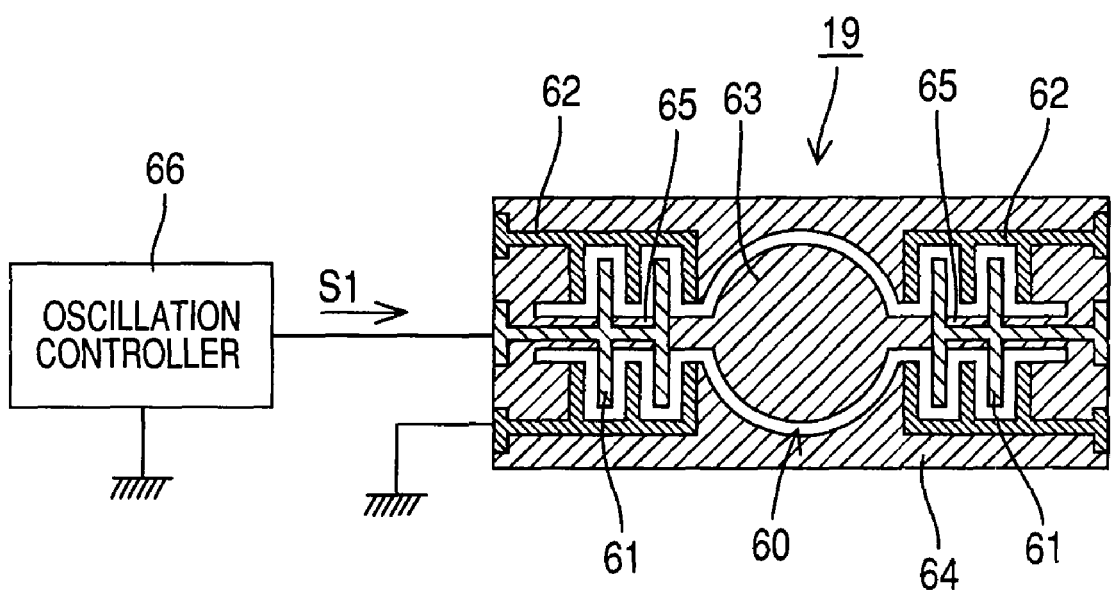
FIG. 3 is an overall view of an oscillating mirror.

FIG. 3 is an overall view of the oscillating mirror 19. The oscillating mirror 19 includes a mirror oscillator 60, and a pair of electrodes (hereinafter referred to as a movable electrode 61 and a fixed electrode 62). For example, the mirror oscillator 60 has a configuration in which a circular mirror portion 63 is arranged in a frame portion 64 to which a pair of support axis portions 65 protruding from the mirror portion 63 are coupled. The mirror oscillator 60 is formed, for example, by applying a micromachining technique such as etching film-forming, etc. to a semiconductor substrate such as a silicon wafer.

The movable electrode 61 is provided to each support axis portion 65 so as to have a comb shape. This movable electrode 61 is formed by vapor-depositing a conductive material on the support bar portion 65. The fixed electrode 62 is provided to the frame portion 64 so as to have a comb shape. This fixed electrode 62 is formed by vapor-depositing a conductive material on the frame portion 64. Teeth of the comb-shaped movable electrode 61 and teeth of the comb-shaped fixed electrode 62 are disposed alternately so as to engage with one another with regular interval therebetween.

The oscillation controller 66 applies a pulse-like driving signal S1 (voltage signal) between the movable electrode 61 and the fixed electrode 62. Specifically, while the driving signal S1 is applied to the movable electrode 61, the fixed electrode 62 is grounded. The mirror portion 63 of the oscillating mirror 19 oscillates in accordance with an electrostatic force (attractive force or repulsive force) generated periodically between the movable electrode 61 and the fixed electrode 62 and a restoring force of the support axis portions 65 deformed torsionally by the electrostatic force. The oscillation controller 66 performs feedback control based on the time interval of the detection timing of the laser light L in the BD sensor 22 so that the period and amplitude of oscillation of the oscillating mirror 19 become predetermined constant values respectively.

2. Laser Controller

In the exemplary embodiment, gradations of an image are represented by a dither method or an error distribution method. Specifically, the laser controller 67 as an example of a controller analyzes image data S2, for example, received from an external information processing apparatus such as a personal computer, and generates dot-pattern data in accordance with the gradation (density) level of an image corresponding to the image data in view of a condition explained hereinafter. The laser controller 67 controls the light-emitting unit 20 to be on and off based on the dot-pattern data while receiving a synchronous signal S3 in accordance with oscillation of the oscillating mirror 19 from the oscillation controller 66.

Dot-concentrated type threshold matrices (also referred to as dither matrices) M are used in a process of generating the dot-pattern data. The laser controller 67 takes a plurality of pixels as one cell F and forms dots D on the photosensitive drum 27 by exposing only pixels according to the gradation level among the plurality of pixels included in each cell F based on the threshold matrices M. In this manner, the size of a mesh formed from the dots D is changed according to the gradation level in order to express a gradation.

Figure 4:
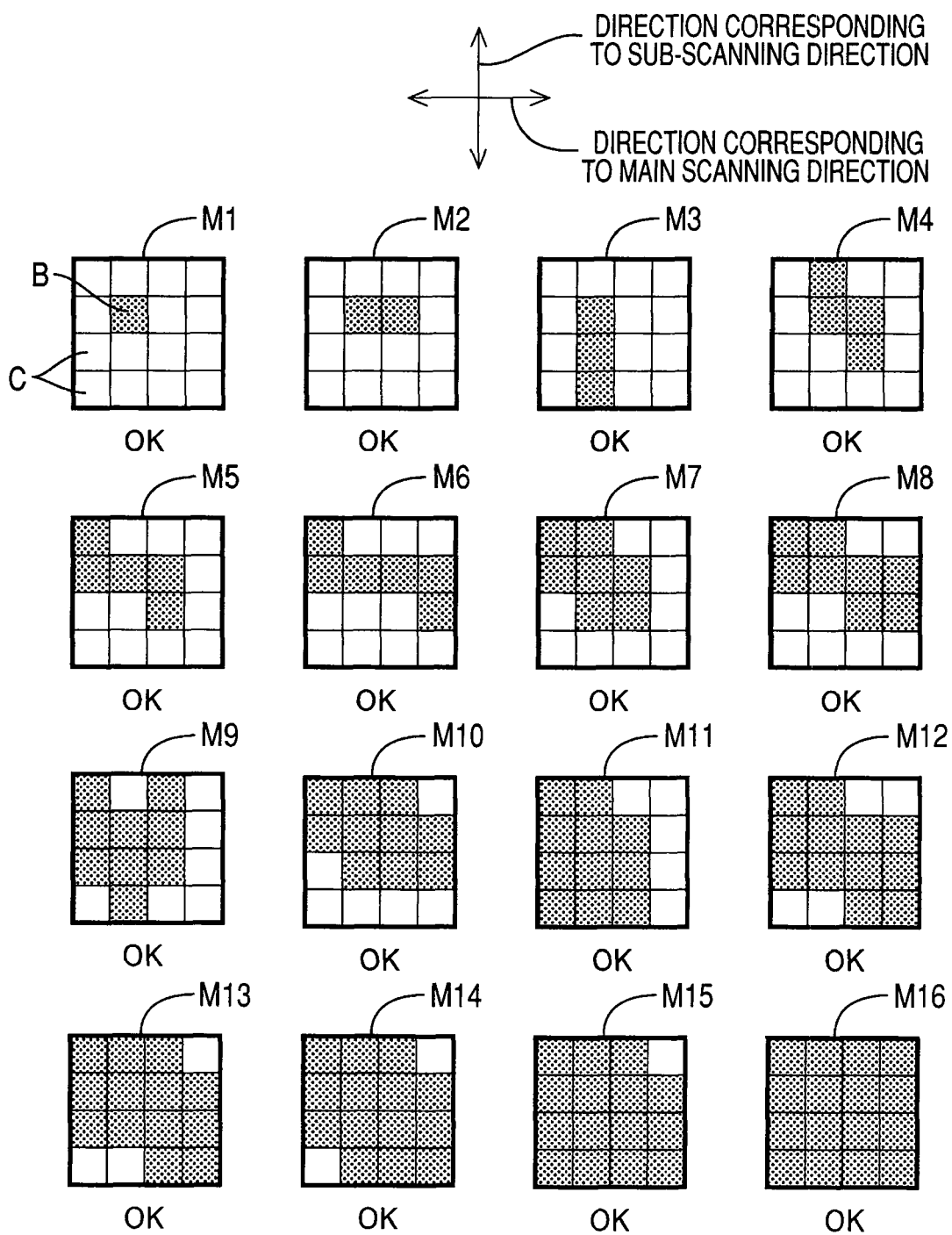
FIG. 4 is a view showing threshold matrices for 16 gradations according to an exemplary embodiment.
Figure 5:
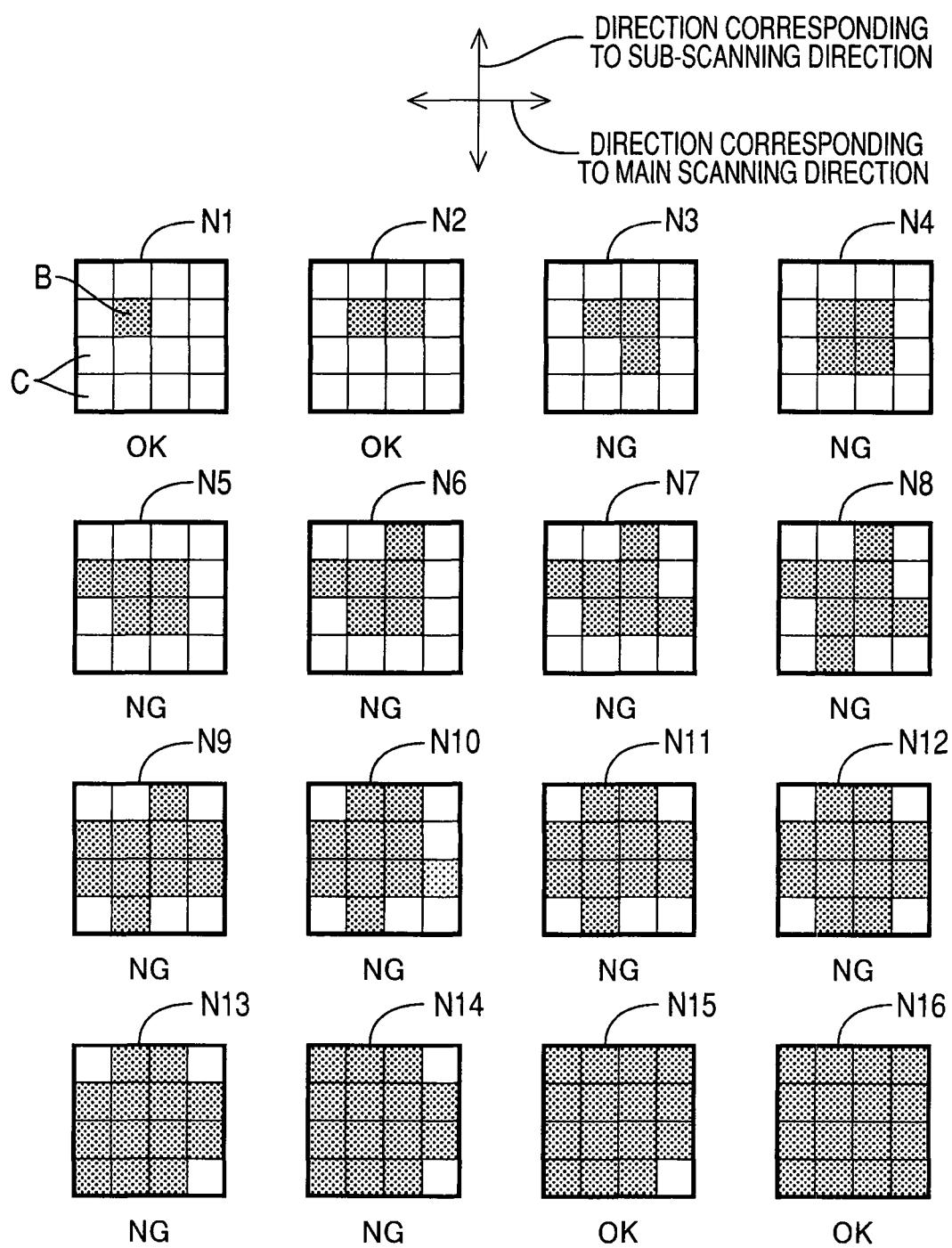
FIG. 5 is a view showing related-art threshold matrices for 16 gradations.

Each threshold matrix M is defined such that the number of columns (squares), in the sub-scanning direction is an even number not smaller than 4. FIG. 4 shows threshold matrices M of 16 gradations (4×4) used in this exemplary embodiment. On the other hand, FIG. 5 shows a related-art threshold matrices N of 16 gradations (4×4). In each of FIGS. 4 and 5, the transverse direction is a direction corresponding to a main scanning direction on the photosensitive drum 27 (direction of scanning of the laser light L from the light-emitting unit 20), and the vertical direction is a direction corresponding to a sub-scanning direction (direction of rotation of the photosensitive drum 27) which is orthogonal to the main scanning direction. In this case, the cell F is composed of 16 pixels (4×4) correspondingly to the threshold matrices M. Each of squares in each threshold matrix M corresponds to each pixel on the photosensitive drum 27. Hereinafter, this square is referred to as "element" of the threshold matrix. Among pixels which form the cell F, pixels corresponding to meshed elements in FIG. 4 (hereinafter referred to as "valid elements B") are exposed with laser light L to form dots D, whereas pixels corresponding to non-meshed elements in FIG. 4 (hereinafter referred to as "invalid elements C") are not exposed with laser light L in order to form no dots D.

With respect to threshold matrices M1 to M16 shown in FIG. 4, the gradation level increases as the number of valid elements B increases. Correspondences between the threshold matrices M1 to M16 and the gradation levels are stored in the form of a data table in a memory 68. The laser controller 67 reads data of a threshold matrix M corresponding to the gradation level of an image from the memory 68 and generates the dot-pattern data.

Figure 6:
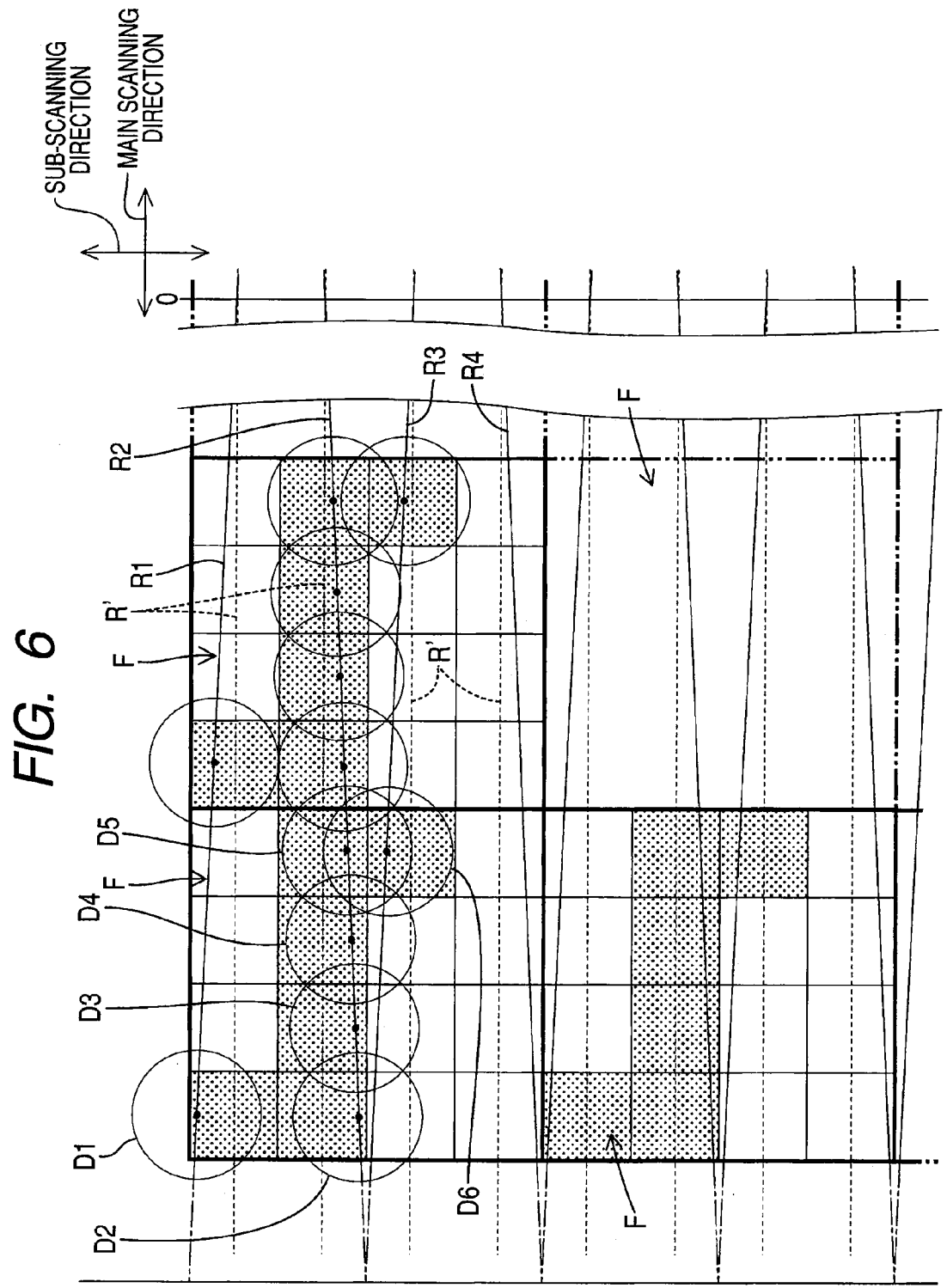
FIG. 6 is a view (left part) showing cells having dots formed based on the threshold matrices according to the exemplary embodiment.
Figure 7:
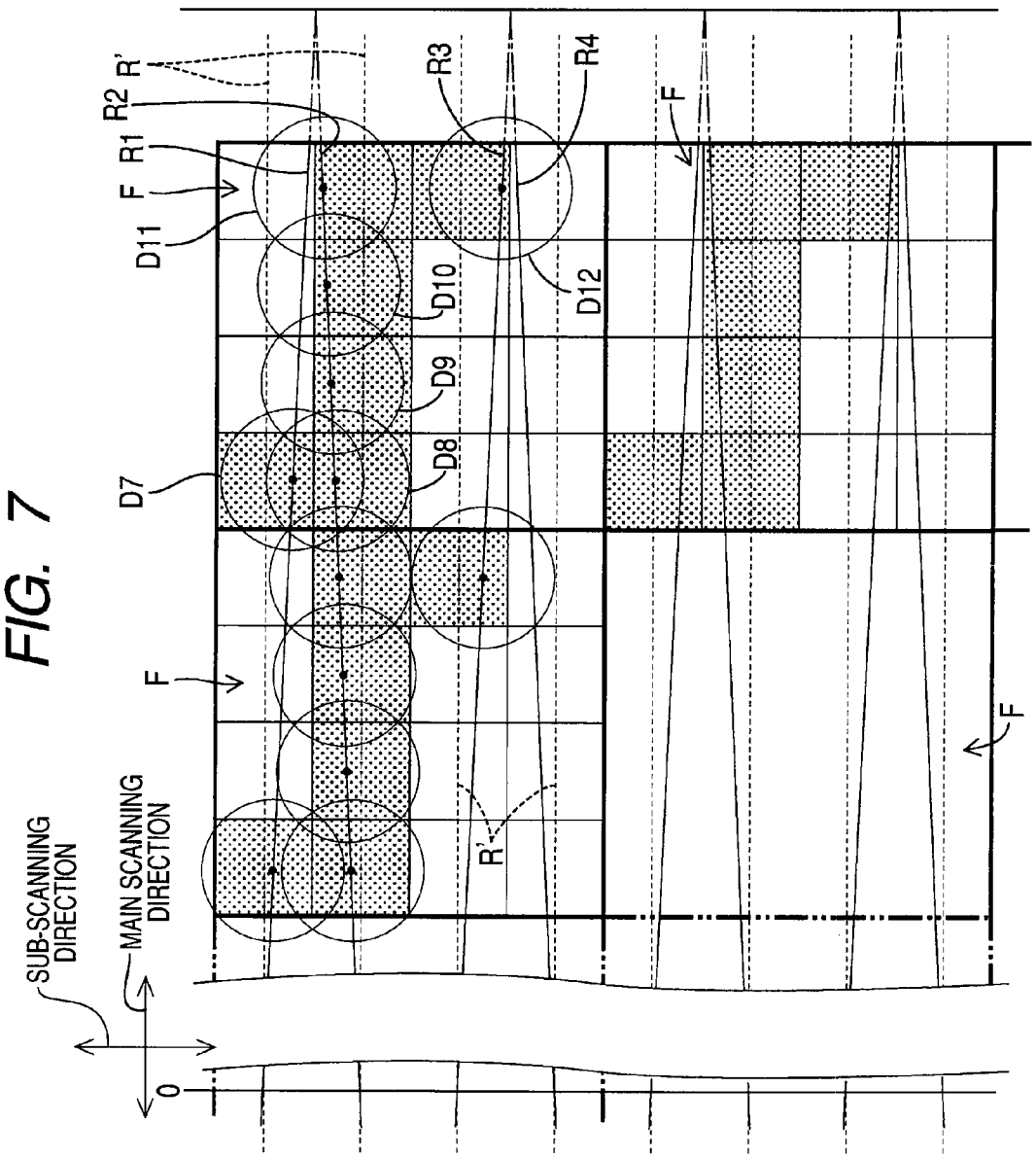
FIG. 7 is a view (right part) showing cells having dots formed based on the threshold matrices according to the exemplary embodiment.
Figure 8:
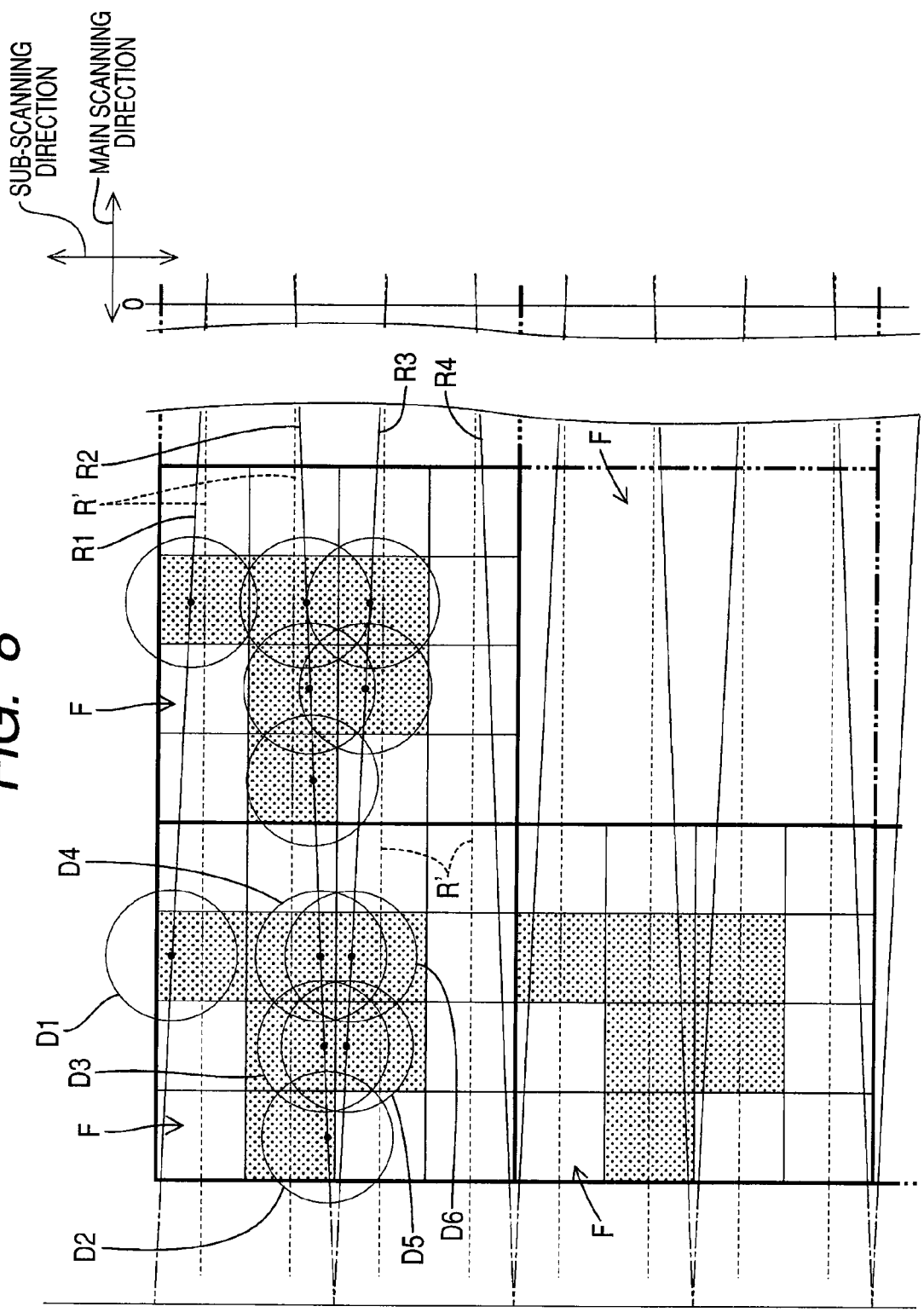
FIG. 8 is a view (left part) showing cells having dots formed based on the related-art threshold matrices shown in FIG. 5.
Figure 9:
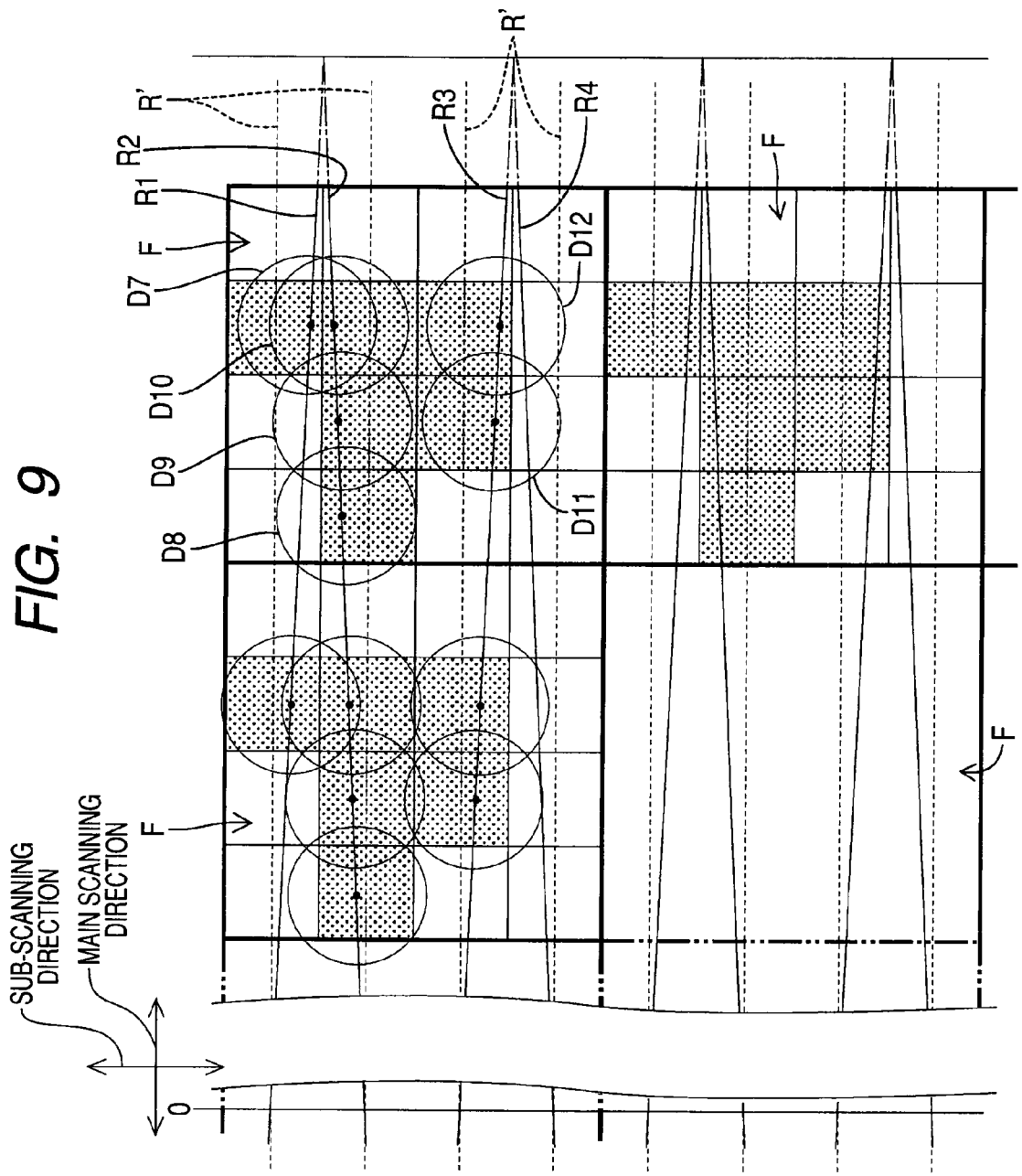
FIG. 9 is a view (right part) showing cells having dots formed based on the related-art threshold matrices shown in FIG. 5.

Here, FIGS. 6 and 7 are views showing cells F in each of which dots are formed based on the threshold matrix M6 according to this exemplary embodiment. FIGS. 8 and 9 are views showing cells F in each of which dots are formed based on the related-art threshold matrix N6. As shown in each of FIGS. 6 to 9, the cells F are arranged in main and sub-scanning directions adjacently, that is, without any gap. Each of FIGS. 6 and 8 shows a left part of the printing region E with respect to a center position O in the main scanning direction. Each of FIGS. 7 and 9 shows a right part of the printing region E with respect to the center position O in the main scanning direction.

The meshed pixels in each of FIGS. 6 to 9 are pixels corresponding to the valid elements B. The reference symbol D in each of FIGS. 6 to 9 shows a dot formed by exposure. The diameter of this dot D (spot diameter of laser light L) is larger than the width of the pixel. In each of FIGS. 4 and 5, "OK" means that a density difference in the main scanning direction does not occur in the cell F and "NG" means that density difference in the main scanning direction occurs in the cell F. In each of FIGS. 6 to 9, only three cells F are shown specifically and the other cells F are omitted.

In each of FIGS. 6 to 9, the broken lines R' express ideal scanning lines. All the ideal scanning lines R' form straight lines along the main scanning direction and the line distance between adjacent ones of the ideal scanning lines R' is entirely uniform. If the scanner unit 16 can scan on each of the ideal scanning lines R', the density difference in the main scanning direction does not occur because dots D are arranged at regular intervals in the main and sub-scanning directions even when, for example, the related-art threshold matrices N are used.

Figure 10:
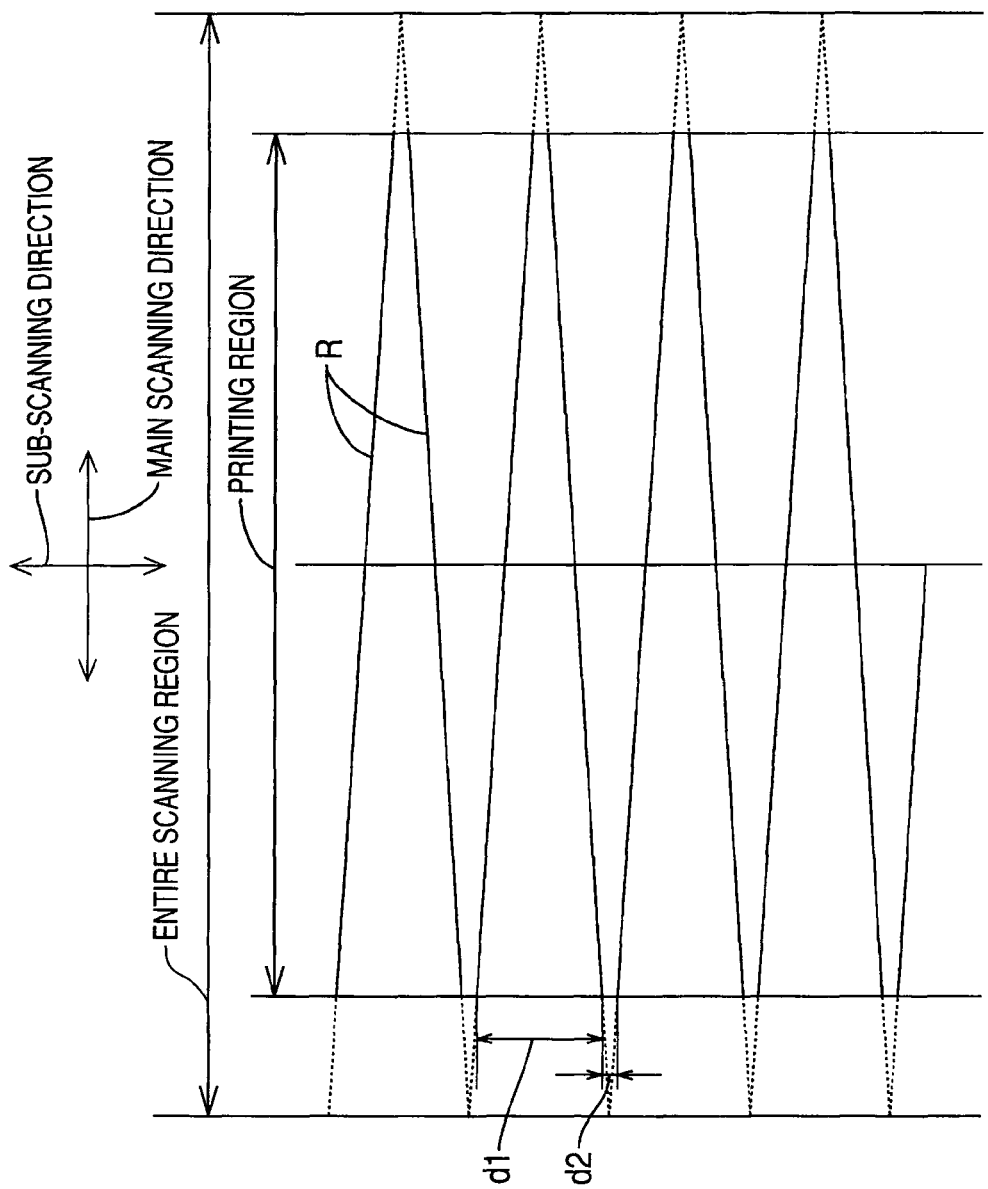
FIG. 10 is a view showing the relation between the rotation angle of an oscillating mirror and the scanning locus of laser light in a related-art optical scanning device.

However, since the scanner unit 16 according to the exemplary embodiment uses reciprocating scanning of the oscillating mirror 19 as described above, scanning lines formed by the reciprocating scanning are set as represented by the solid lines R1, R2, R3, R4, ... shown in FIGS. 6 to 9 (also see FIG. 10).

(1) The Case Where the Related-Art Threshold Matrices are Used

In the case where the related-art threshold matrix N6 is used, a dot D1 is formed on a first scanning line R1 slightly upper than an ideal scanning line R', and dots D2, D3 and D4 are formed on a second scanning line R2 slightly lower than an ideal scanning line R', as shown in FIG. 8. Additionally, dots D5 and D6 are formed on a third scanning line R3 slightly upper than an ideal scanning line R'. That is, the pair of dots D3 and D5 and the pair of dots D4 and D6 get close to each other whereas the pair of dots D1 and D4 get away from each other with respect to the ideal scanning lines R'. In other words, the pair of adjacent dots D3 and D5 and the pair of adjacent dots D4 and D6 are closer than the interval of the adjacent ideal scanning lines R' or a distance between the centers of the adjacent pixels. And, the pair of adjacent dots D1 and D4 is farther than the interval of the adjacent ideal scanning lines R'. It is noted that each pair of dots D adjacent to each other in the direction corresponding to the sub-scanning direction is formed through one reciprocation of the oscillating mirror 19. That is, during one reciprocation of the oscillating mirror 19, the laser light L is deflected in a first way and a second way opposite to the first way along the main scanning direction. Each pair of dots D is formed by the laser light L though one reciprocation from the first way to the second way or through one reciprocation from the second way to the first way. And, the pair of dots D get close to each other is formed by the laser light L through one of the reciprocation from the first way to the second way and the reciprocation from the second way to the first way. On the other hand, the pair of dots D get away from each other is formed by the laser light L through the other one of the reciprocations.

Since the pair of dots D1 and D4 and the pair of dots D4 and D6 are offset with each other, these pairs have no influence on the density of the cell F. However, the pair of dots D3 and D5 has an influence on the density of the cell F because the overlap degree of the pair of dots D3 and D5 varies in accordance with the line distance between the second scanning line R2 and the third scanning line R3. Specifically, since the diameter of the dot D is larger than the width of the pixel as described above, it is conceived that the density of the cell F decreases as two dots D become closer to each other so that a region occupied by the dots D becomes narrower, whereas the density increases as the dots D becomes farther from each other.

In addition, as shown in FIG. 9, a pair of dots D7 and D10 get close to each other whereas a pair of dots D9 and D11 and a pair of dots D10 and D12 get away from each other with respect to ideal scanning lines R'. Accordingly, the pair of dots D9 and D11 have an influence on the density of the cell F because the overlap degree of the pair of dots D9 and D11 varies in accordance with the line distance between the second scanning line R2 and the third scanning line R3.

As described above, in the cell F having a dot pattern formed based on the related-art threshold matrix N6, the generated density (gradation) level varies according to the line distance between adjacent scanning lines R. That is, in the case where, for example, a gradation is generated based on the related-art threshold matrix N6 over the entire first scanning line R1 and the second scanning line R2, a density difference occurs in the main scanning direction. Such a problem may occur also in the case where any of the threshold matrices N3 to N14 is used.

(2) The case Where Threshold Matrices According to this Exemplary Embodiment are Used Each of the threshold matrices M1 to M16 according to this exemplary embodiment as shown in FIG. 4 is set to have a pattern in which the density difference in the main scanning direction does not occur in the cell F formed based on the threshold matrix. That is, each of the threshold matrices M1 to M16 is defined to have a pattern such that dots D are formed on the photosensitive drum 27 based on pairs of valid elements B adjacent to each other in a direction corresponding to the sub-scanning direction so that the number of pairs of adjacent ones of the dots D getting close to each other is equal to the number of pairs of adjacent ones of the dots D getting away from each other. In other words, each of the threshold matrices M1 to M16 is defined such that the patter of dots D to be formed in the cell F includes a plurality of pairs of adjacent dots in the sub-scanning direction. Among the plurality of pairs of adjacent dots to be formed, the number of adjacent dots which are closer than an interval of adjacent ideal scanning lines is equal to the number of pairs of adjacent dots which are farther than the interval.

More specifically, in the case where, for example, the threshold matrix M6 is used, a dot D1 is formed on a first scanning line R1 slightly upper than an ideal scanning line R' and dots D2 to D5 are formed on a second scanning line R2 slightly lower than an ideal scanning line R', as shown in FIG. 6. In addition, a dot D6 is formed on a third scanning line R3 slightly upper than an ideal scanning line R'. That is, the pair of dots D1 and D2 get away from each other whereas the pair of dots D5 and D6 get close to each other with respect to the ideal scanning lines R'. For this reason, the pair of dots D1 and D2 and the pair of dots D5 and D6 are offset with each other. As a result, these pairs have no influence on the density of the cell F as a whole.

In addition, as shown in FIG. 7, a pair of dots D7 and D8 get close to each other whereas a pair of dots D11 and D12 get away from each other with respect to the ideal scanning lines R'. For this reason, the pair of dots D7 and D8 and the pair of dots D11 and D12 are offset with each other. As a result, these pairs have no influence on the density of the cell F as a whole.

As described above, in each cell F having the dot pattern formed based on the threshold matrix M6 according to this exemplary embodiment, the number of pairs of dots D getting close to each other with respect to ideal scanning lines R' is equal to the number of pairs of dots D getting away from each other with respect to the ideal scanning lines R'. Cells F located in any position in the main scanning direction have the same density (the same gradation level). Accordingly, the density difference in the main scanning direction does not occur in the entire image. This also applies to the case where any of the threshold matrices M1 to M16 is used.

Figure 11:
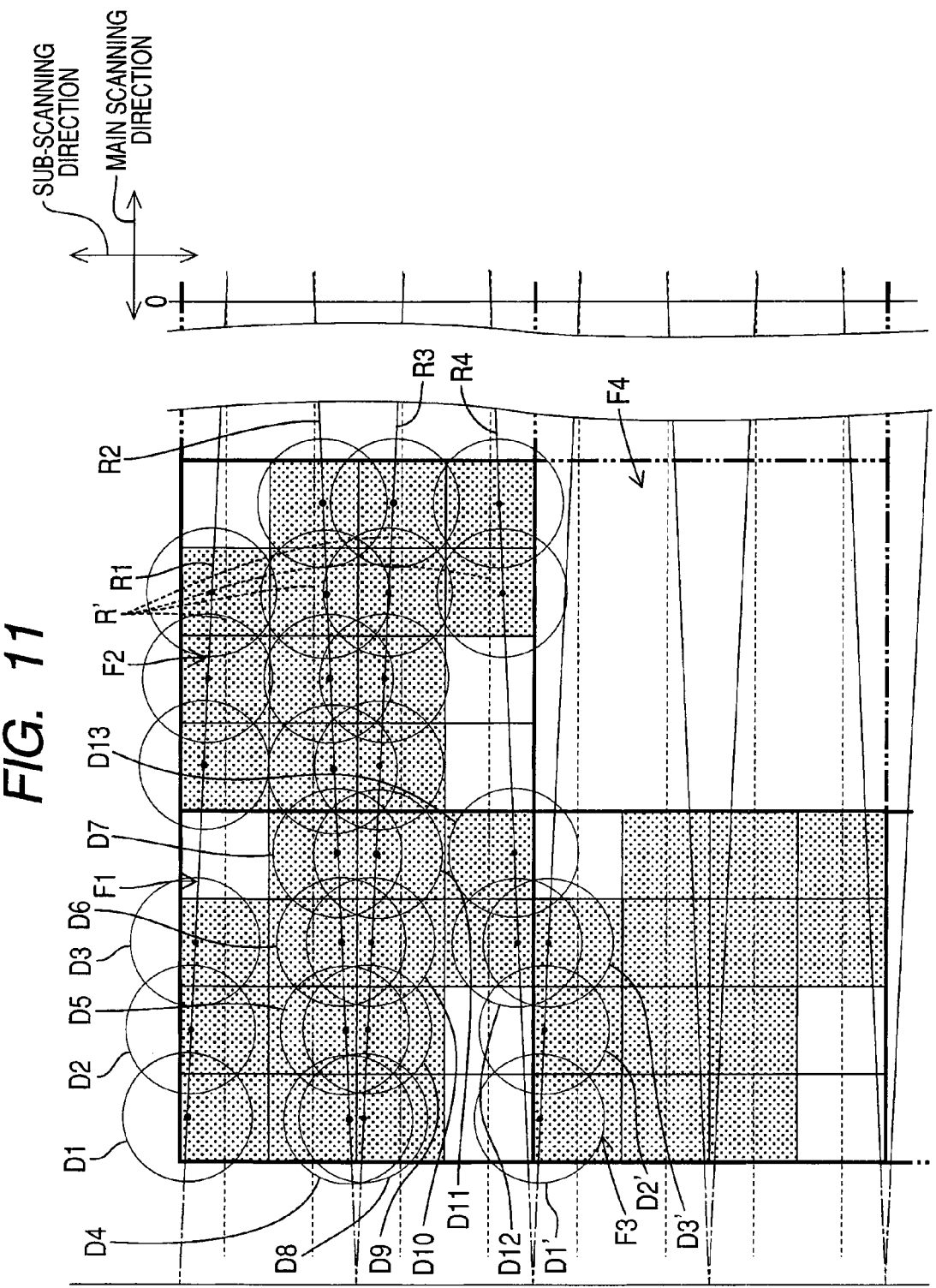
FIG. 11 is a view showing cells having dots formed based on the threshold matrices according to the exemplar embodiment.

It is noted that a pair of adjacent dots in the threshold matrix herein includes a pair of adjacent dots across cells, which are explained below with reference to FIG. 11. FIG. 11 shows the threshold matrix M13 shown in FIG. 4 as an example for explaining a case where adjacent dots across cells exist. In the threshold matrix M13, dots D1 to D3 are formed on a first scanning line R1 slightly upper than an ideal scanning line R', dots D4 to D7 are formed on a second scanning line R2 slightly tower than an ideal scanning line R', dots D8 to D11 are formed on a third scanning line R3 slightly upper than an ideal scanning line R' and dots D12 and D13 are formed on a fourth scanning line R4 slightly lower than an ideal scanning line R' as shown in FIG. 11. That is, the pair of dots D1 and D4, D2 and D5, D3 and D6, D10 and D12, and D11 and D13 get away from each other. That is, five pairs of adjacent dots getting away from each other exist in a cell F1. On the other hand, the pair of dots D4 and D8, D5 and D9, D6 and D10, and D7 and D11 get close to each other with respect to the ideal scanning lines R'. That is, four pairs of adjacent dots getting close to each other exist in the cell F1. Additionally, one pair of dots D12 in the cell F1 and D3' in a cell F3, which is one of adjacent cells of a cell F1 in the sub-scanning direction, get close to each other with respect to the ideal scanning lines R'. Therefore, considering the pair of dots D12 and D3', the number of pairs of adjacent dots getting away from each other and the number of pairs of adjacent dots getting close to each other in a cell 1 is same in the cell F1, and therefore, these pairs of adjacent cells have no influence on the density of the cell F1 as a whole.

Further, in the determination of dot pattern, dot pattern is determined such that the above-described condition is satisfied in each of the cells, and therefore, the dot pattern in each of the threshold matrices M1 to M16 may be changed in view of adjacent cell.

3. Effect of the Exemplary Embodiment

According to this exemplary embodiment, each of the threshold matrices M1 to M16 is formed to have a pattern in which dots D are formed on the photosensitive drum 27 based on pairs of valid elements B adjacent to each other in a direction corresponding to the sub-scanning direction so that the number of adjacent ones of the dots D getting close to each other is equal to the number of pairs of adjacent ones of the dots D getting away from each other. Accordingly, in each cell F having the dot pattern formed based on the threshold matrix M, the number of pairs of dots D getting close to each other with respect to ideal scanning lines R' is equal to the number of pairs of dots D getting away from each other with respect to ideal scanning lines R'. Cells F located in any position in the main scanning direction have the same gradation (the same gradation level). Thus, the density difference in the main scanning direction does not occur in the entire image.

Since density differences in the main scanning direction are offset in each cell F, cells F can be disposed to be adjacent to each other in the main scanning direction without any gap, as shown in FIGS. 6 and 7. Therefore, it is possible to suppress the problem in the related-art optical scanning device that blank regions corresponding to odd-number pixels are formed between the respective adjacent cells F.

Additionally, it is possible to suppress density difference by using a relatively small number of cells compared with the related-art optical scanning device.

Other Exemplary Embodiments

While the present invention has been shown and described with reference to certain exemplary embodiments thereof it will be understood by those skilled in the art that various changes in form and details may be made therein without departing from the spirit and scope of the invention as defined by the appended claims. For example, also the following exemplary embodiments fall within the technical scope of the invention.

(1) Although threshold matrices of 16 gradations (4×4) is described in the exemplary embodiment, any other gradation level such as 256 gradations (16×16) may be used. Also in this case, a threshold matrix for each gradation may be formed to have a pattern in which dots D are formed on the photosensitive drum 27 based on valid elements B adjacent to each other in a direction corresponding to the sub-scanning direction so that the number of pairs of adjacent ones of the dots D getting close to each other is equal to the number of pairs of adjacent ones of the dots D getting away from each other.

What is claimed is:
1. An optical scanning device comprising:
an emission unit which emits a light beam;
an oscillating mirror which deflects the light beam to reciprocate on a scanning surface in a main scanning direction; and
a controller which controls the emission unit to be on and off to form a pattern of dots in each cell of a plurality of cells defined on the scanning surface, each cell being composed of a plurality of pixels, the pattern being formed according to a gradation of the cell and based on a dot-concentrated threshold matrix,
wherein the threshold matrix is defined such that the pattern of dots to be formed in the cell includes a plurality of pairs of adjacent dots in a sub-scanning direction, the sub-scanning direction being orthogonal to the main scanning direction, and
wherein, among the plurality of pairs of adjacent dots to be formed in each cell, a number of pairs of adjacent dots which are closer than an interval of adjacent ideal scanning lines is equal to a number of pairs of adjacent dots which are further than the interval.

2. The optical scanning device according to claim 1, wherein the cells are defined adjacently in the sub-scanning direction on the scanning surface.

3. The optical scanning device according to claim 1, wherein the interval of the adjacent ideal scanning lines corresponds to a distance between centers of adjacent pixels included in the cell in the sub-scanning direction.

4. The optical scanning device according to claim 1, wherein a diameter of the dot to be formed by the light beam is larger than a width of the pixels.

5. The optical scanning device according to claim 1, wherein adjacent cells in the main scanning direction are aligned.

6. A printing apparatus comprising:
a printing unit including a photosensitive material; and
an optical scanning device comprising:
an emission unit which emits a light beam;
an oscillating mirror which deflects the light beam to reciprocate on the photosensitive material in a main scanning direction; and
a controller which controls the emission unit to be on and off to form a pattern of dots in each cell of a plurality of cells defined on the photosensitive material, each cell being composed of a plurality of pixels, the pattern being formed according to a gradation of the cell and based on a dot-concentrated threshold matrix,
wherein the threshold matrix is defined such that the pattern of dots to be formed in the cell includes a plurality of pairs of adjacent dots in a sub-scanning direction, the sub-scanning direction being orthogonal to the main scanning direction,
wherein, among the plurality of pairs of adjacent dots to be formed in each cell, a number of pairs of adjacent dots which are closer than an interval of adjacent ideal scanning lines is equal to a number of pairs of adjacent dots which are further than the interval, and wherein the printing unit forms an image on the scanned photosensitive material and transfers the image onto a printing medium.

7. The printing apparatus according to claim 6, wherein the cells are defined adjacently in the sub-scanning direction.

8. The printing apparatus according to claim 6, wherein adjacent cells in the main scanning direction are aligned.

9. An optical scanning device comprising:

an emission unit which emits a light beam;

an oscillating mirror which deflects the light beam to reciprocate on a scanning surface, which is moved in a first direction, in a first way and a second way opposite to the first way along a second direction orthogonal to the first direction; and a controller which controls the emission unit to selectively emit the light beam to form a pattern of dots in each cell of a plurality of cells defined on the scanning surface, the pattern being formed according to a gradation of the cell and based on a threshold matrix, wherein the threshold matrix is defined such that the pattern of dots to be formed in the cell includes a pair of adjacent dots in the first direction, and wherein, among the plurality of adjacent dots to be formed in each cell, the number of pairs of adjacent dots to be formed by the light beam through a reciprocation from the first way to the second way is equal to the number of pairs of dots to be formed by the light beam through a reciprocation from the second way to the first way.

10. The optical scanning device according to claim 9, wherein the threshold matrix is a dot-concentrated type threshold matrix.

11. The optical scanning device according to claim 9, wherein the cells are adjacent to each other without a gap therebetween.

12. The optical scanning device according to claim 9, wherein adjacent cells in the second direction are aligned.

13. An optical scanning device comprising:

an emission unit which emits a light beam;

an oscillating mirror which deflects the light beam to reciprocate on a scanning surface in a main scanning direction; and a controller which controls the emission unit to be on and off to form a pattern of dots in each cell of a plurality of cells defined on the scanning surface, each cell being composed of a plurality of pixels, the pattern being formed according to a gradation of the cell and based on a dot-concentrated threshold matrix method, wherein the pattern of dots in each cell is determined such that the pattern of dots to be formed in the cell includes a plurality of pairs of adjacent dots in a sub-scanning direction, the sub-scanning direction being orthogonal to the main scanning direction, and wherein, among the plurality of pairs of adjacent dots to be formed in each cell, a number of pairs of adjacent dots which are closer than an interval of adjacent ideal scanning lines is equal to a number of pairs of adjacent dots which are further than the interval.

14. The optical scanning device according to claim 13, wherein the cells are defined adjacently in the sub-scanning direction on the scanning surface.

15. The optical scanning device according to claim 13, wherein adjacent cells in the main scanning direction are aligned.

* * * * *